United States Patent
Struzzieri

(10) Patent No.: US 7,540,566 B2
(45) Date of Patent: Jun. 2, 2009

(54) VEHICLE SEAT ADJUSTMENT EXTENSION ARM

(76) Inventor: Charles Struzzieri, 4100 Schwalbe Dr., Villa 85, Sarasota, FL (US) 34235

( * ) Notice: Subject to any disclaimer, the term of this patent is extended or adjusted under 35 U.S.C. 154(b) by 0 days.

(21) Appl. No.: 11/724,576

(22) Filed: Mar. 16, 2007

(65) Prior Publication Data

US 2008/0224525 A1    Sep. 18, 2008

(51) Int. Cl.
*A47C 2/06*    (2006.01)
*A47C 2/07*    (2006.01)

(52) U.S. Cl. ............................................ 297/337
(58) Field of Classification Search ............... 297/337, 297/311
See application file for complete search history.

(56) References Cited

U.S. PATENT DOCUMENTS

| | | | | |
|---|---|---|---|---|
| 942,818 | A * | 12/1909 | Flindall | 297/317 |
| 1,987,851 | A * | 1/1935 | Holman | 297/337 X |
| 2,021,120 | A * | 11/1935 | Wilkins | 297/317 |
| 3,870,366 | A * | 3/1975 | Rogers | 297/440.23 |
| 5,755,488 | A * | 5/1998 | Beda et al. | 297/337 |
| 6,027,168 | A * | 2/2000 | Crossman et al. | 297/337 |
| 6,634,711 | B2 * | 10/2003 | Phillips et al. | 297/337 |
| 6,688,692 | B2 * | 2/2004 | Phillips et al. | 297/337 |
| 6,767,062 | B2 * | 7/2004 | Piretti | 297/337 |
| 6,824,215 | B2 * | 11/2004 | Koepke et al. | 297/337 |
| 6,827,402 | B2 * | 12/2004 | Habermann et al. | 297/337 |
| 6,832,814 | B2 * | 12/2004 | Stenzel et al. | 297/337 |
| 6,986,550 | B2 * | 1/2006 | Gevaert et al. | 297/337 |
| 6,994,400 | B2 * | 2/2006 | Koepke et al. | 297/337 |
| 7,159,942 | B2 * | 1/2007 | Costaglia | 297/337 X |
| 7,341,233 | B2 * | 3/2008 | McMains | 248/424 |

* cited by examiner

*Primary Examiner*—Rodney B. White
(74) *Attorney, Agent, or Firm*—John M. Brandt

(57) ABSTRACT

An extension arm to facilitate the horizontal adjustment of vehicle seats with a bar activated lock releasing mechanism. The arm is fabricated of an appropriate length of a sturdy material such as metal or high impact plastic having one end attachable to the seat bar and having a gripable handle or strap at the other. The arm may also incorporate a mechanism for varying the distance from the bar to the handle by altering the position of attachment at the bar end.

4 Claims, 3 Drawing Sheets

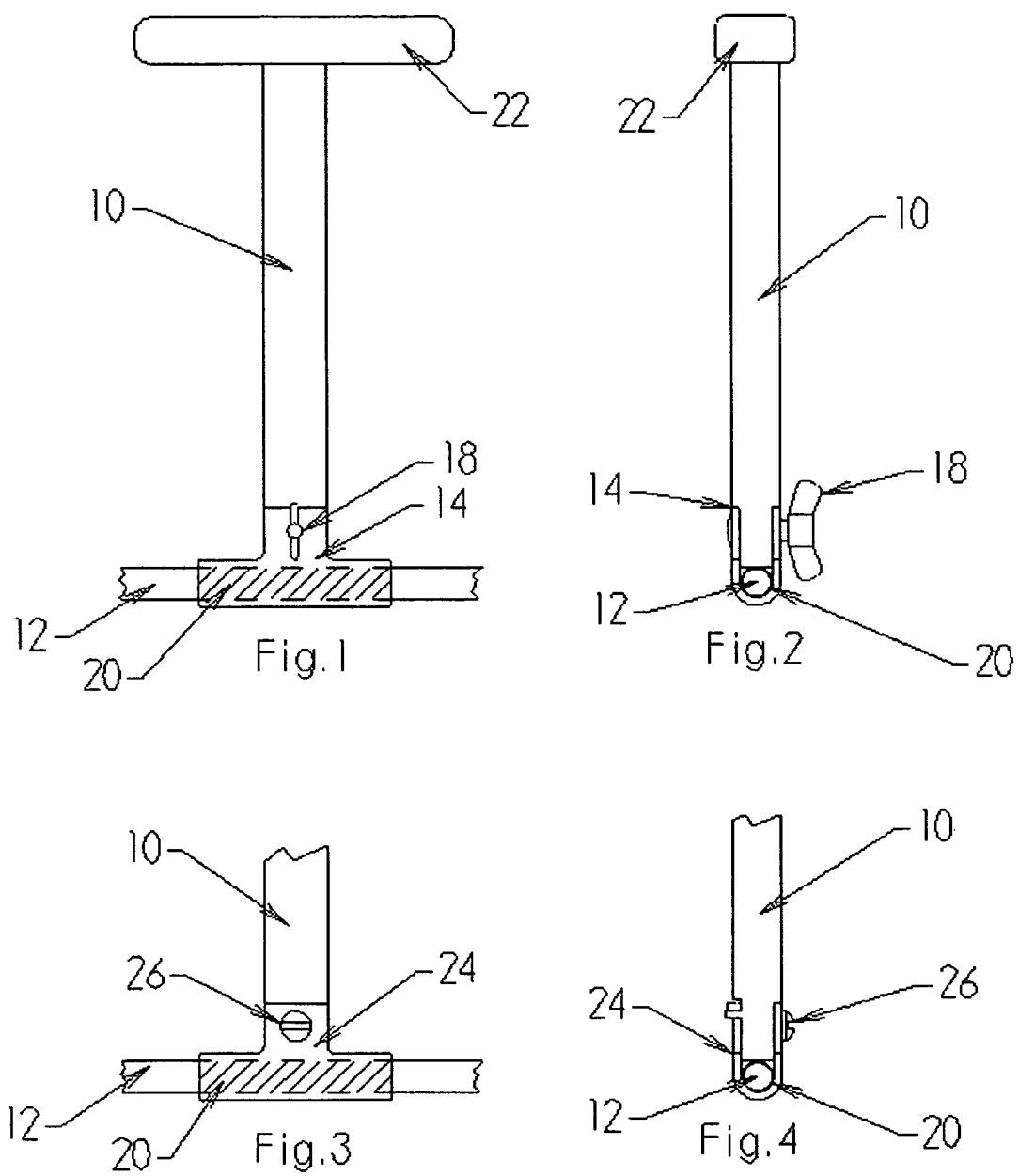

VEHICLE SEAT ADJUSTMENT EXTENSION ARM

CROSS-REFERENCE TO RELATED APPLICATIONS

This application is based on the disclosure of Provisional Application Ser. No. 60/689,047 filed Jun. 10, 2005 by the same inventor which is hereby incorporated by reference.

BACKGROUND OF THE INVENTION

1. Field of the Invention

The invention resides in the field of accessories useful in a variety of automotive vehicles and more particularly relates to devices for adjusting the position of passenger seats.

2. Description of the Prior Art

In most vehicles designed to transport individual passengers such as automobiles, trucks, mini-vans and the like, one or more of the seats is adjustable in approximately the horizontal plane from front to rear. The seats are slideably mounted on rails and are held in place by a locking mechanism which is released by a bar in the front of the seat near the floor. Lifting up on the bar releases the seat for repositioning and releasing the bar secures the seat in the adjusted position according to the needs of the passenger. This ordinarily is true for both sides of the vehicle including the driver side particularly in the front.

Reaching the bar can be difficult for the less agile whether they be handicapped, older, or otherwise somewhat impaired from reaching down, pulling up on the locking bar and then sliding the seat to the desired location. Even those without any such limitations will find that an adjustment can take several attempts as they are, to a certain extent, bent over when gripping the seat release bar.

The present invention is designed to facilitate the repositioning of a vehicle seat by providing an extension arm attachable to the lock release bar so that the bar may be pulled up and the seat position adjusted while the passenger or driver is more or less in the upright position they will be in while riding in the car. The applicant knows of no similar device in the prior art arranged to accomplish this result.

SUMMARY OF THE INVENTION

The invention may be summarized as a device to facilitate the adjustment of a vehicle seat of the type whose horizontal or front to back position is controlled by a locking mechanism consisting of a bar positioned transverse the seat near the floor. Most passenger vehicles employ this arrangement if they do not use powered seats which are positioned by mechanisms driven by electric motors operated from button controls placed somewhere above the level of the seat platform.

To set the seat position, the passenger reaches down, lifts the bar allowing the seat to slide along rails, positions the seat by pushing back or pulling forward with his legs, and then releases the bar to relock the seat in position. Bending over to accomplish this task is difficult for some and then finding the exact position is often a matter of trial and error for all.

The present invention provides an extension arm having a means to secure the lower end of the arm to the seat-locking bar, either temporarily or semi-permanently; and a handle, strap, or some other form of gripping arrangement at the upper end. The arm when attached to the bar and pulled upward will thus release the locked seat while the passenger remains in a more or less upright position allowing the seat to be repositioned in a speedy and efficient manner.

In one embodiment, the arm is of a fixed length and is permanently attached to the seat bar; in another, provision is made for removal after use; and in yet another, the length of the arm in relation to the bar and the gripping end is adjustable.

These features and the use of the invention will be better understood from the drawings and description of the preferred embodiment which follow.

DESCRIPTION OF THE DRAWINGS

FIG. 1 is a front view of a first embodiment of the invention;

FIG. 2 is a side view of the embodiment of FIG. 1;

FIG. 3 is a front view of an additional embodiment of the invention;

FIG. 4 is a side view of the embodiment of FIG. 3;

DESCRIPTION OF THE PREFERRED EMBODIMENT

Figure 5:
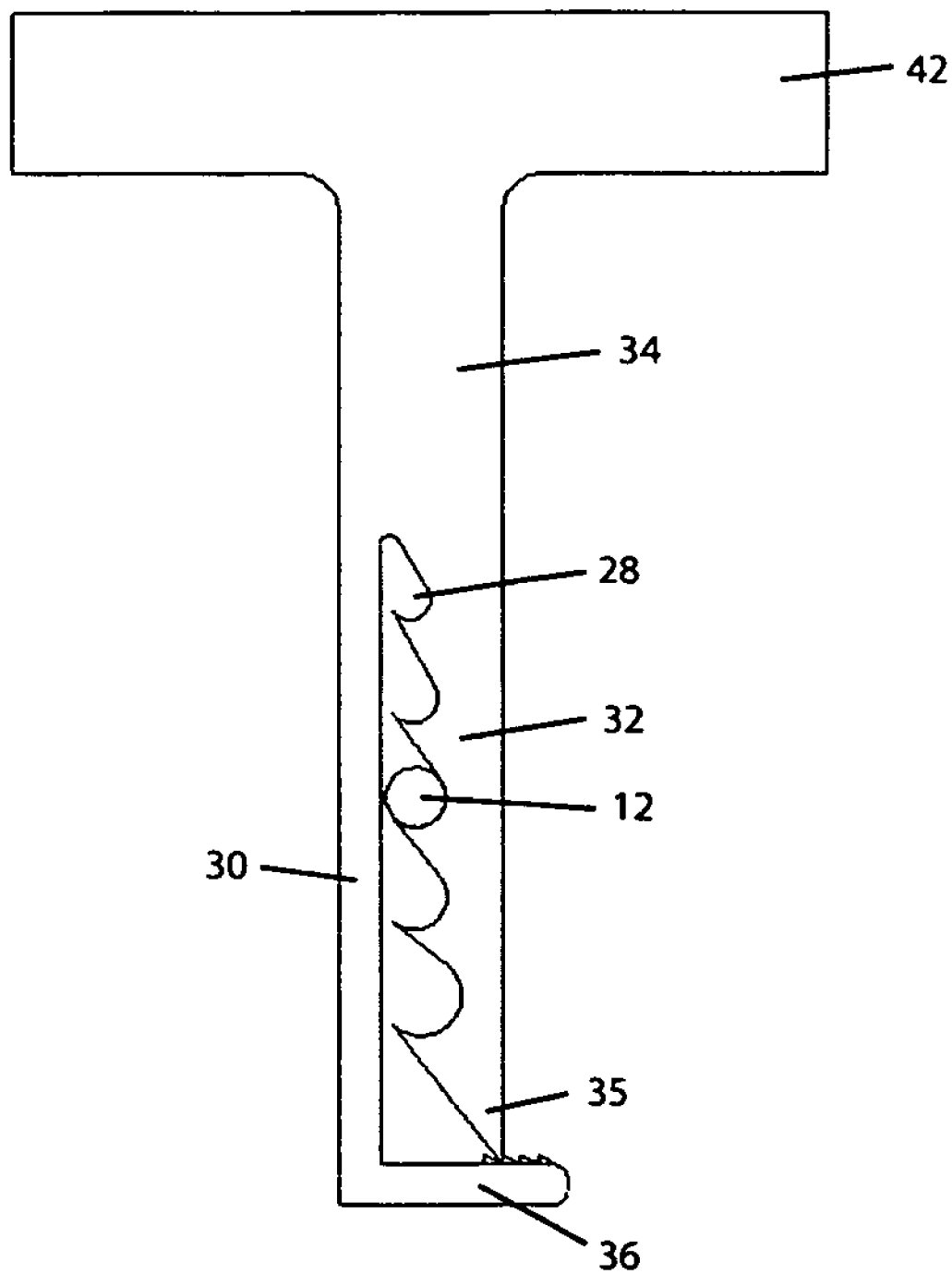
FIG. 5 is a side view of a further embodiment of the invention.

Referring to FIG. 1, there is shown a front view of a first embodiment of the invention in which extension arm 10 is attached to seat adjustment bar 12 which is representative of vehicle seat positioning mechanism release and lock bars disposed underneath and across seats. Arm 10 is semi-permanently attached to bar 12 by, for example, U-clamp 14 held in place by bolt 16 passing through arm 10 and clamp 14 and secured by wing nut 18. A length of friction tape 20 may be wrapped around bar 12 at the point of contact with clamp 14 to achieve a more firm attachment of arm 10. Handle 22 is disposed at the top of arm 10 to provide a means to grip the arm and lift the seat adjustment bar.

FIG. 2 is a side view of FIG. 1 more clearly illustrating the attachment mechanism. The arm may be repositioned along the bar as well as lowered to the vehicle floor by loosening and tightening nut 18. The arm may also be completely removed by fully unscrewing nut 18 and removing the bolt.

FIGS. 3 and 4 illustrate an additional embodiment in which the attachment of the arm to the bar is accomplished by the use of spring member 24 affixed to the arm by, for example, screw 26. A gripping means at the opposite end, not shown, is provided to pull the arm upward, spread the spring over the bar, and then secure the arm in place as the spring returns to shape.

Figure 6:
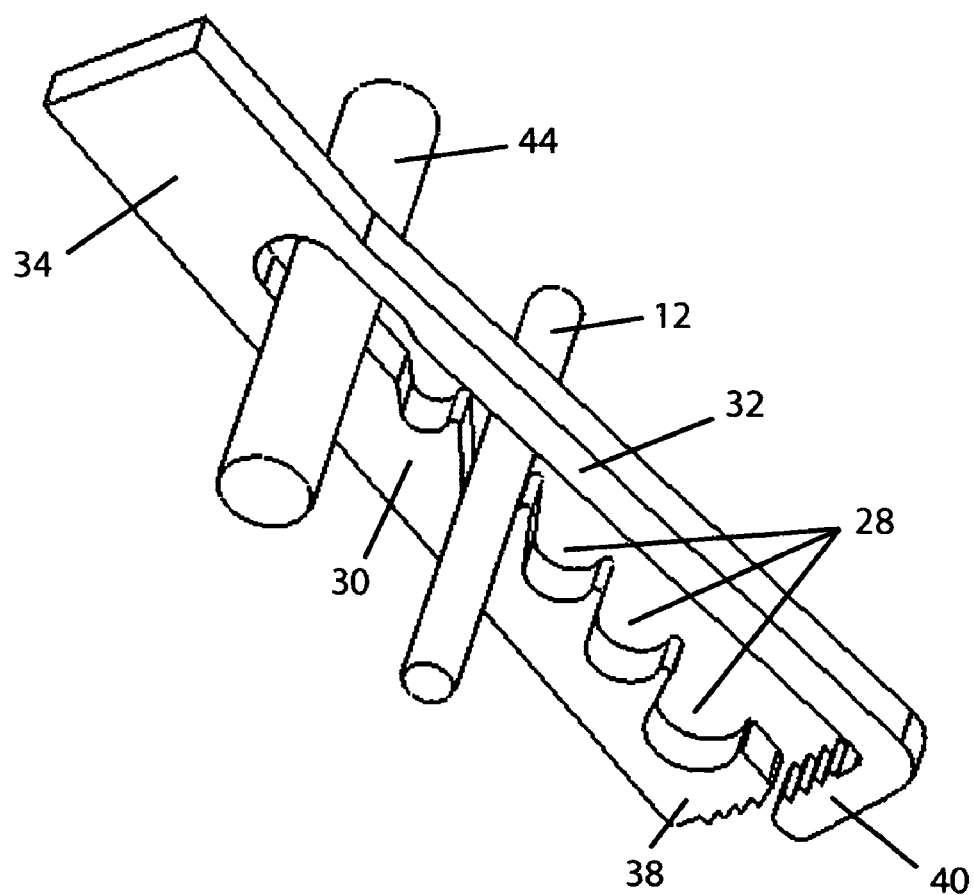
FIG. 6 is a perspective view of the embodiment of FIG. 5.

FIGS. 5 and 6 illustrate embodiments providing for selection and positioning of the distance or length of the upper gripping end of the arm from the vehicle seat adjustment bar. Each has a plurality of passages 28 formed between opposite spaced apart sides 30 and 32 of arm 34 constructed of a strong semi-flexible material such as glass filled polyurethane. The seat adjustment bar 12 fits into anyone of passages 28 after which sides 30 and 32 are pressed together and held in place by an interlocking saw tooth arrangement consisting of an upper tooth 35 and a lower set of teeth 36 in FIG. 5, and in FIG. 6, an upper set of teeth 38 and a lower set 40.

The gripping means may be permanently attached to the arm as is shown by handle 42 in FIG. 5. Alternatively provision may be made for arm 34 to receive a removable handle 44 or strap or similar device.

As variations in the above described embodiment will now be obvious to those skilled in the art, the invention is accordingly defined by the following claims.

What is claimed is:

1. An extension arm arranged to facilitate the horizontal position adjustment of a vehicle seat having a position locking mechanism operable by a vertically moveable locking bar adapted to be disposed across a lower portion of the seat, said arm comprising in combination:
   a. an elongated structural member forming a body of the arm;
   b. Attaching means for attaching a first end of said member to said locking bar; and
   c. gripping means disposed at a second end of said member whereby said locking bar may be lifted and said seat released to be adjusted by pulling on said gripping means.

2. The arm of claim 1 wherein said arm comprises a bifurcated two sided semi-flexible longitudinal structure having a plurality of spaced apart recesses along its longitudinal axis, each of said recesses capable of gripping said bar when said sides are pressed together.

3. The arm of claim 2 further including locking means for securing said sides together.

4. The arm of claim 3 wherein said locking means comprises a pair of mutually interlocking saw tooth members disposed at said first end of said arm.

* * * * *